US010796236B2

(12) United States Patent
Jones (10) Patent No.: US 10,796,236 B2
(45) Date of Patent: *Oct. 6, 2020

(54) MESSAGING SYSTEM (71) Applicant: MICROSOFT TECHNOLOGY LICENSING, LLC, Redmond, WA (US)

(72) Inventor: Gareth E. Jones, Winchester (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,472

(22) Filed: Feb. 12, 2019

(65) Prior Publication Data

US 2019/0173821 A1 Jun. 6, 2019

Related U.S. Application Data (63) Continuation of application No. 15/402,918, filed on Jan. 10, 2017, now Pat. No. 10,367,768.

(51) Int. Cl.
*G06N 5/04* (2006.01)
*H04L 12/58* (2006.01)
(Continued)

(52) U.S. Cl.
CPC .............. *G06N 5/04* (2013.01); *G06F 16/285* (2019.01); *G06F 16/3344* (2019.01); *G06F 40/274* (2020.01); *G06N 20/00* (2019.01); *G06Q 10/10* (2013.01); *G06Q 10/107* (2013.01); *H04L 51/02* (2013.01); *H04L 51/16* (2013.01);
(Continued)

(58) Field of Classification Search
CPC .. G06F 40/274; G06F 16/285; G06F 16/3344; G06N 20/00; G06N 5/04; H04L 51/02; H04L 51/36; G06Q 10/10; G06Q 10/107
See application file for complete search history.

(56) References Cited

U.S. PATENT DOCUMENTS

| 2013/0159408 | A1* | 6/2013 | Winn | G06N 20/00 709/204 |
| 2013/0212190 | A1* | 8/2013 | Patil | G06N 5/04 709/206 |
| 2014/0074952 | A1* | 3/2014 | White | G06Q 10/107 709/206 |

* cited by examiner

Primary Examiner — Kyung H Shin
(74) Attorney, Agent, or Firm — NovoTechIP International PLLC (57) ABSTRACT

A system includes a processor and a memory in communication with the processor. The memory includes executable instructions that, when executed by the processor, cause the processor to control the device to perform functions of receiving a first communication sent from a first device associated with a first user via a communication network, the first communication intended for a second device associated with a second user and in communication with the first device via the communication network; determining that the first communication is related to scheduling a meeting between the first and second users; identifying a time slot for the meeting based on second user schedule information; automatically generating a second communication responding to the first communication on behalf of the second user, the second user communication including an indication of the identified time slot for the meeting; and causing the second communication to be displayed on at least one of the first and second devices. The system thus reduces or eliminates unnecessary communications exchanged between users to schedule a meeting.

21 Claims, 2 Drawing Sheets

(51) Int. Cl.
*G06Q 10/10* (2012.01)
*G06F 16/28* (2019.01)
*G06F 16/33* (2019.01)
*G06F 40/274* (2020.01)
*G06N 20/00* (2019.01)

(52) U.S. Cl.
CPC .............. *H04L 51/36* (2013.01); *H04L 51/20* (2013.01); *H04L 51/32* (2013.01)

MESSAGING SYSTEM

CROSS-REFERENCE TO RELATED APPLICATIONS

This application is a continuation of co-pending U.S. patent application Ser. No. 15/402,918, titled "MESSAGING SYSTEM," filed on Jan. 10, 2017, which claims priority under 35 U.S.C. § 119 or 365 to Great Britain Patent Application No. 1620802.7 filed Dec. 7, 2016, the disclosure of which is hereby incorporated by reference in its entirety.

BACKGROUND

Various messaging systems are known which enable a user to send a message to another user over a network such as the Internet. Such messages may include instant messaging (IM) messages, voice messages and video messages. To enable this, typically each of the users has a respective instance of a communication client application on his or her respective user terminal (which the user may have installed him- or herself, or which may have come preinstalled, and wherein the client application may be a stand-alone application or may be implemented as functionality incorporated into another application or into the operating system of the terminal). Alternatively one or both of the users may use a web-hosted instance of the communication client.

To send a message, a first of the users composes a message through a user interface of the client application, e.g. by entering a textual message into a free-text field of the user interface. The first user then actuates a send control in the user interface (e.g. clicks or touches a send button), thus causing the first user's client to send the message to the client application of the second user, e.g. via a public network such as the Internet or a private network such as a company intranet. The client of the second user then presents the received message to the second user through a user interface of the second user's client, e.g. displaying it on screen.

Nowadays, it is also known for one of the clients to predict a likely response to a message. That is, upon receipt of a message from the first user, the second user's client may analyse the content of the message and generate a proposed response. The second user then manually selects whether he or she wishes to send the proposed response or instead compose a response of his/her own.

SUMMARY

Nonetheless, it is recognized herein that modern communications still involve a lot of unnecessary exchanges that could potentially be avoided. Particularly, as the first user does not necessarily have ready access to pertinent information on the second user, then the first user may have to send one or more unsuitable or impertinent proposals, suggestions, questions or such like, which the second user has to manually reply to before a conclusion to the conversation can be reached. This results in an inefficiency in the communication. It would be desirable to reduce the number of interactions between users and thereby improve the efficiency of communication. Particularly, the inventors have recognized that there is scope to reduce the number of interactions required by the second (i.e. receiving) user.

According to one aspect disclosed herein, a system includes a processor and a memory in communication with the processor. The memory includes executable instructions that, when executed by the processor, cause the processor to control the device to perform functions of receiving a first communication sent from a first device associated with a first user via a communication network, the first communication intended for a second device associated with a second user and in communication with the first device via the communication network; determining that the first communication is related to scheduling a meeting between the first and second users; identifying a time slot for the meeting based on second user schedule information; automatically generating a second communication responding to the first communication on behalf of the second user, the second user communication including an indication of the identified time slot for the meeting; and causing the second communication to be displayed on at least one of the first and second devices.

In another implementation, a method for operating a system includes receiving a first communication sent from a first device associated with a first user via a communication network, the first communication intended for a second device associated with a second user and in communication with the first device via the communication network; determining that the first communication is related to scheduling a meeting between the first and second users; identifying a time slot for the meeting based on second user schedule information; automatically generating a second communication responding to the first communication on behalf of the second user, the second user communication including an indication of the identified time slot for the meeting; and causing the second communication to be displayed on at least one of the first and second devices.

In another implementation, a system includes means for receiving a first communication sent from a first device associated with a first user via a communication network, the first communication intended for a second device associated with a second user and in communication with the first device via the communication network; means for determining that the first communication is related to scheduling a meeting between the first and second users; means for identifying a time slot for the meeting based on second user schedule information; means for automatically generating a second communication responding to the first communication on behalf of the second user, the second user communication including an indication of the identified time slot for the meeting; and means for causing the second communication to be displayed on at least one of the first and second devices.

For instance, say the first user sends an IM message to the second user saying "Hi Dave. Want to meet up for lunch tomorrow?", tomorrow being Wednesday. The user agent can use natural language processing or such like to interpret the first user's message, then consult the second user's calendar to determine that, e.g., the second user has a meeting from 12 noon-2 pm on Wednesday but has no engagements during the day on Thursday. Therefore, in response, the user agent automatically composes a response saying something like "Sorry, not free tomorrow lunchtime. How about Thursday instead?"

In embodiments, the user agent is arranged to prevent the message being provided to the second user. Alternatively, the user agent may be configured to allow the message to be provided to the second user, but to include an indication to the second user that the predicted response has already been sent.

Either way, the automated response mechanism advantageously enables the first user to compose an amended version of the message based on the predicted response, without the second user needing to have composed a reply him/herself nor manually responded in any way (and in embodiments without even having had to read or see the message). The user agent may be arranged to subsequently analyse the amended content in the amended version of the message (the amended content being composed by the first user). Then, on condition that the amended content does not warrant a further predicted response based on said information, the user agent may provide the amended version to the second user in order for the second user to give a manual response to the amended message.

Thus, the disclosed mechanism advantageously eliminates at least one round of avoidable interaction between the first and second user, thereby improving the efficiency of communication.

The analysis and prediction may be performed after the first user has actuated (e.g. clicked or touched) a send control to send the message, in response to the actuation of the send control. Alternatively, the analysis may begin and the predicted response may be provided to the first user before the first user has actuated any send control, and in embodiments, even before the first user has finished composing the message (e.g. while the first user is still typing the message). Note therefore that where it is said the user agent analyses content of the message, or the like, this does not necessarily refer to all the content of a complete message.

The user agent may be implemented on a server disposed between the first user and the second user, the server comprising one or more server units at one or more geographic sites. Alternatively, the user agent may be implemented on a second user terminal through which the second user, or a user terminal of the first user may exchange messages. In further alternatives, the user agent could be distributed between any two or all three of the servers, the second user's terminal and the first user's terminal.

The analysis of the content of the first user's message may be based on intercepting the actual message and directly analysing the content (e.g. by receiving and analysing the actual text composed by the first user). Alternatively, the analysis may be performed by receiving and analysing metadata indicative of the content (e.g. indicative of abstracted logical elements, linguistic elements, or the intent of the first user). Regarding the outputting step, the data output by the user agent may be the actual response itself (e.g. actual predicted text or audio), or alternatively the output data may take the form of metadata indicative of elements in the predicted content to be rendered at the first user's terminal or metadata such as availability information of the second user that may be used to formulate the response at the first user's terminal (e.g. a user agent on a server returns metadata indicative or abstracted logical or linguistic elements, which the client on the first user's terminal receives and uses to render the actual text of the response at the first user's terminal). The response may take the form of a simulated reply of the second user, or may take the form of information indicating what a predicted reply of the second user might be, or information about the second user that might help the first user construct a message that would improve communication efficiency.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

As mentioned, it is known to predict a response to a message, but conventionally the predicted response has to be manually approved by the recipient.

It is recognized herein that by using modern natural language processing (NLP) and/or machine learning techniques, or the like, and by incorporating sufficient data on the second (receiving) user, such predictions can become accurate and sophisticated enough to be able to predict, for example, whether users are likely to accept or reject requests, or even to propose helpful alternatives. For instance, an incoming message might state "Shall we grab some dinner at Mario's at 7 tonight?", and the message response prediction might offer the recipient a response such as "I'm busy at 7, how about 8?" based on calendar information; or "Dinner sounds great, but how about Juan's Grill instead?" based on a bad user review of Mario's Restaurant, or more frequent reviews of Mexican than Italian restaurants.

Furthermore, when taking into account both the content of the received message and information on the receiving user, it is recognized herein that the prediction can in fact be accurate and sophisticated enough to be allowed to respond autonomously on behalf of the second user.

In fact, in embodiments, efficiency can be improved by enabling the sender to see the predictions before the original outgoing message has been presented or even sent to the recipient user, as this would mean the sender can avoid an actual interaction with the recipient that would almost certainly be followed by a rejection or proposed alternative. A better user experience would be to use the technology to propose alternative initial messages for the sender, based on data from the recipient. For example, as the sender types "Can I call you about the project?" (or when he/she presses send), the sender's user interface could display a message based on data from the recipient stating that "Gareth is already on the phone right now, why don't you suggest a call this afternoon at 3 pm instead?". Assuming Gareth is willing to have a call at 3 pm, this would allow the sender to send a single message and the recipient to respond once, rather than a delayed back-and-forth conversation to agree a time for a call.

To achieve this from a technical standpoint, while the sender is typing a message (or when he/she presses send), data is sent to an agent acting on behalf of the recipient. This data might consist of the raw message text, or a representation of the salient parts of the message (e.g. an expression of intent to schedule a meeting at a specific time or location). The agent acting on behalf of the recipient might be on recipient's device that would receive the message, as part of the receiving app, another app on the device (e.g. virtual keyboard or digital assistant), or the device operating system; or the agent might be located elsewhere, such as an independent cloud-based service or one that forms part of the messaging platform. When the agent receives the data, it will determine the factors that might impact a response from the recipient based on other data available to it. This other data may comprise calendar data (e.g. current/future availability, typical patterns/preferences), previous messaging data (with the sender and others), social network or other 3rd party data about the user (e.g. restaurant or movie reviews, or location check-in history), input history (e.g. typing style), and/or data viewed by the recipient (e.g. webpages or views in apps recently displayed to the user). Rather than predicting a response to the message to offer to the recipient to send, the agent sends pertinent data to the sender automatically (e.g. availability at the proposed time or an alternative time, or alternative location/venue/film suggestions); this returned data may be transmitted in the form of a raw message to display directly to the sender, or for the sender's messaging application or agent to convert into a more consumable form. The messaging platform may for example be an instant messaging, email, or SMS platform.

In embodiments, privacy issues are preferably also taken into account, e.g. what data is permitted to be sent from the sender to the recipient's agent, and/or what data is permitted to be sent from the recipient's agent back to the sender. This may be based on the data and/or the relationship between sender and recipient.

The following describes a platform for enabling predictions in accordance with embodiments of the present disclosure. In embodiments, data related to a message is returned to the sender before the message is provided to the recipient or before the message is even sent, wherein data from an agent working for the recipient that helps the sender to re-write their message and therefore reduce communication. For instance, this data may comprise calendaring data, restaurant/film reviews, etc.

Figure 1:
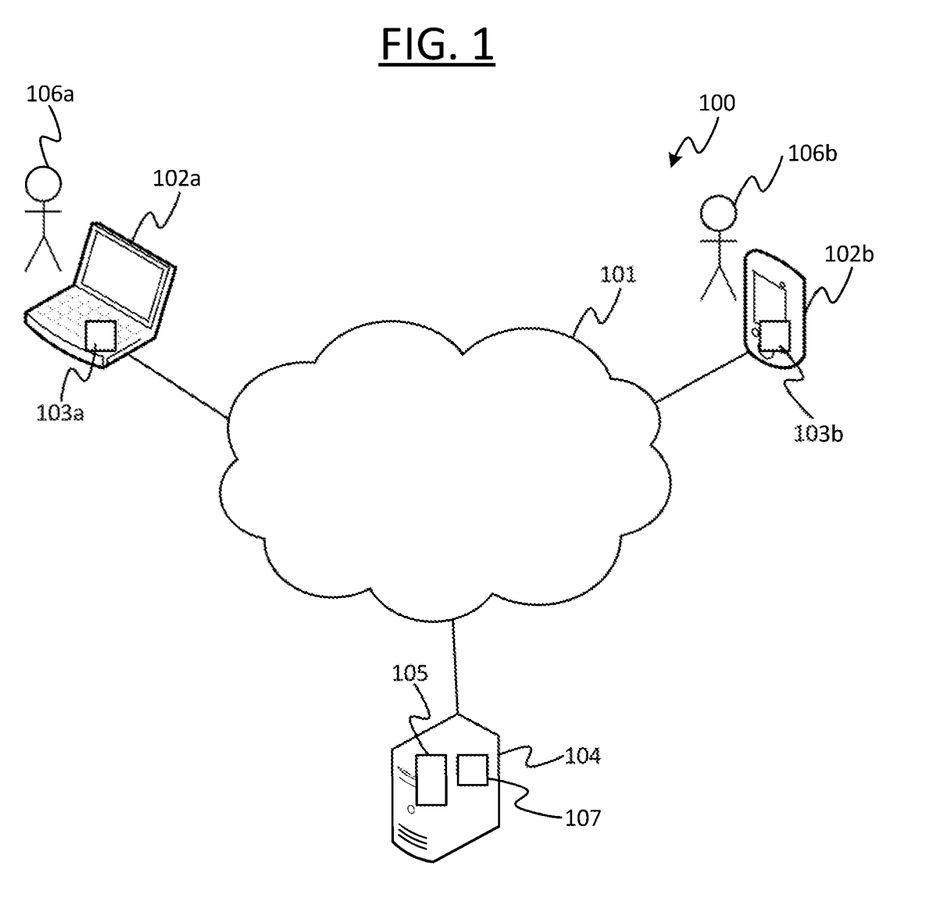
FIG. 1 is a schematic diagram of a communication system.

FIG. 1 schematically illustrates a communication system 100 in accordance with embodiments disclosed herein. The communication system comprises a plurality of user terminals 102a and 102b each configured to connect to a computer network 101, and each installed with a respective communication client application 103a and 103b. Each of the user terminals 102 is also used by at least one respective user 106a or 106b. In FIG. 1, two user terminals and their respective clients and users are shown for illustrative purposes: a first user terminal 102a installed with a first communication client 103 a, and a second user terminal 102b installed with a second communication client 103b (in embodiments, each client 103a, 103b being a respective instance of the same client product). However, it will be appreciated that there may be different numbers of user terminals 102 involved in other scenarios covered by the present disclosure. The network 101 is preferably a packet-based network. In embodiments it may take the form of a wide-area internetwork such as that commonly referred to as the Internet. Alternatively, the network 101 may take the form of another type of network such as a company intranet, a mobile cellular network, or a wireless local area network (WLAN), or a combination of any of these and/or the Internet.

Each of the user terminals 102 may take any of a variety of different forms, such as a desktop computer, laptop, tablet, smartphone, smart watch, pair of smart glasses, smart TV, or set-top box (and the different user terminals 102 need not necessarily take the same form as one another). Note therefore that the term "computer" as used herein does not restrict to a traditional desktop or laptop computer.

The communication clients 103 are each installed on computer-readable storage of their respective user terminal 102, and arranged for execution on a respective processing apparatus of the respective user terminal 102. The storage may take the form of one or more storage media (e.g. magnetic memory, electronic memory, and/or optical memory) implemented in one or more memory units. The processing apparatus may take the form of one or more processing units. Each of the communications clients 103 is configured so as to be able to establish a communication session with one or more of the other communication clients 103 running on one or more of the other respective user terminals 102. The user of each user terminal 102 is then able to send messages to each of the other users of each of the other user terminals 102 participating in the session. In embodiments, the messages may include any one or more "traditional" types of message such as: IM messages, live voice (e.g. VoIP) streams (of the sending user's voice), and/or live video streams (e.g. a head-and-shoulders shot of the sending user). Alternatively or additionally, the messages may include one or more other types of message such as: still images (e.g. picture messaging, emojis, or emoticons), pre-recorded video clips (e.g. video messaging), pre-recorded audio clips (e.g. voice mail), a shared geographical location (e.g. as detected by a localization system such as GPS), screen sharing streams, remote slide representations, and/or electronic or virtual whiteboard streams.

By way of illustration, embodiments below may be described from the perspective of the first user 106a sending a message to the second user 106b, but it will be appreciated that similar teachings may also apply in the reverse direction and/or in relation to other combinations of users. As will be discussed later, the techniques can also be applied to multiparty scenarios comprising more than two users, e.g. group messaging.

In embodiments the communication system 100 comprises a server 104 connected to the network 101, arranged to provide a communication service via which the communication session is at least in part conducted. In such embodiments, the message from any given one of the users may be sent from the sending user terminal 102a to the server 104, and the server 104 may be configured to forward the message on to the recipient user terminal 102b (or to each of the recipient terminals in a multiparty communication session). Note that a server herein refers to a logical entity which may be physically implemented by one or more server units located at one or more geographical sites. Distributed storage and computing techniques in themselves will be familiar to a person skilled in the art. Note also that it is not essential for the message to be transmitted via the server. Instead the message may be transmitted directly between the terminals 102a, 102b (i.e. without being relayed via a server). In such cases a server 104 may not be required at all (a pure peer-to-peer system), or the server 104 may still be included in the system to provide one or more supporting functions such as providing authentication certificates, address look-up, or hosting of user information 105 such as contact lists, user profiles, user permission settings, and/or presence statuses.

Note also, in yet further embodiments, the system need not comprise a communication client 103 installed on each user terminal 102. For instance, alternatively one, some, or all of the user terminals could instead be installed with a general purpose web browser operable to access a web-based version of the client application ("web client") hosted on the server 104 (wherein the web-browser could be a standalone application or could be implemented as functionality incorporated into another application or into the operating system of the device). In such cases the described functionality may be achieved by the web-client rather than the locally installed client (i.e. client installed locally on an individual user terminal 102). Or more generally, the functionality disclosed herein can be implemented by any combination of a local client application 103 (on each user terminal 102) and/or server hosted functionality (e.g. a web client). For conciseness the various options in this respect will not be repeated each time the functionality below is described, but it will be understood that these options apply throughout.

Regardless of whether a local client is installed on each user terminal 102 or whether a server-hosted client is used, the server 104 may also be arranged to provide additional functionality in association with the communication service. Particularly, the server 104 maintains a database of user information 105 for each of the users 106, e.g. comprising a contact list, profile, presence state, and/or permission settings. Note: it is not essential to store such user information 105 centrally at a server 104. Instead some or all of the information 105 for a given user 106 could be stored on the user's own user terminal 102. However, that would mean information was not necessarily available to that user when he or she logged on from a different device 102. As another alternative, the user information 105 could be stored in a distributed P2P database (though in some use cases users may not be comfortable having their personal details stored in this manner).

The user information 105 may comprise a contact list for each of the users 106. The contact list for a given user is a list of the other users which that user has accepted as contacts. This will be discussed in more detail shortly. Alternatively or additionally, the user information 105 may comprise a respective user profile, a respective status message, a respective presence status, and/or respective location information for each respective user. This supplementary information is made available from the server 104 via the network 101 to the users 106a, 106b. In embodiments, some or all of this information may only be able available to any other users of the service whom the user in question has accepted as a contact.

The information in each user's profile may comprise for example any one or more of: an email address of the respective user, a profile picture of the respective user, a place of residence of the respective user, and/or a time zone or local time of the respective user, etc. The respective profile information for a given user is typically set by that user him- or herself, via the respective client application 103 which sends it to be stored at the server 104. The status message is sometimes also referred to as a "mood message". It is a brief statement composed by the respective user him- or herself as to his or her current state of being, e.g. "Feeling good as the sun is out today" or "000, back in Monday 25th January".

The presence status indicates the user's availability for communication within the communication system, e.g. selected from a set comprising two or more of: do not disturb (DND), offline, inactive, or available. In embodiments the presence status is determined at least partially automatically, e.g. by detecting when the user is not logged in and is therefore offline, and/or by detecting that if the user has not interacted with his or her user terminal 102 (e.g. has not moved the mouse) then he or she is inactive. DND is typically set manually by the respective user. The available state may be determined automatically if the user is neither offline nor inactive and has not selected DND. Some of the possible presence states may be detected by the client application 103 and reported to the server 104, e.g. whether the user is inactive. Other possible states may be detected directly by the server 104, e.g. whether the user is offline. Some possible states may be detected by either client 103 or server 104, e.g. whether the user has selected DND, and/or whether he or she is available.

The location information may be set manually by the respective user 106, but in embodiments it is detected automatically based on one or more location technologies, e.g. a satellite-based location technology such as GPS or Galileo, or by reference to other wireless nodes such as cell towers of a mobile communication system, anchor nodes of an indoor positioning system, or Wi-Fi hotspots, etc. The client 103 detects the location of the respective user terminal 102 and reports this to the server 104.

The contact list for a given user records which of the other users of the communication system that user has accepted as contacts. This in turn determines what permissions the other users are granted in relation to communicating with the user via the communication system, in dependence on whether they are each a contact or not.

There are at least two possible categories of permissions that the contact list determines. The first category defines whether or not the first and second users 106a, 106b can communicate with one another (at least via the communication system in question). For example, in embodiments, the first and second users 106a, 106b cannot exchange one or more types of communication without having first accepted one another as contacts. For example, communication of IM messages, picture messages, video messages, voice mail, and/or a shared location may not be allowed between the first and second users 106a, 106b until they have accepted one another as contacts (though it is not excluded that in some embodiments other communication types such as a call establishment request may be allowed prior to accepting one another as contacts).

The second category of permissions defines what information 105 of the second user 106b can be accessed by the first user 106a (or their client 103a) via the communication system, and vice versa. For instance, in embodiments the first user 106a is not allowed to view the second user's status message, presence, nor location until the first user 106a has been accepted as a contact of the second user 106b. In embodiments, the first user 106a may be allowed to view certain selected parts of the second user's profile information via the communication system without having been accepted as a contact of the second user 106b, while other parts of the profile information may remain unavailable until accepted as a contact. In general, any combination of viewable and not-viewable supplementary information may be enforced for non-contacts.

In some embodiments, the permissions for the second user's contacts and non-contacts may be defined at least in part by a set of user preferences (i.e. settings) which can be set by the second user 106b him- or herself (and similarly for the first user 106a). These settings may be stored in the database 105 at the server 104 or locally on the user's own respective user terminal 102. Thus there are maintained a first set of permissions for the contacts and a second set of permissions for non-contacts (where the second set may be a subset of the first, or may overlap with the first), wherein one or more of these permissions can be set by the second user 106b as a user preference (and similarly for the first user's preferences). These settable permissions may comprise one or more permissions in the first category, i.e. which communication types are not allowed for non-contacts, and/or one or more permissions in the second category, i.e. which types of information 105 are visible to non-contacts (e.g. profile information, presence, etc.). In embodiments, some of the preferences may have default settings which are in place when the respective user's client application 103 is first installed on the respective user terminal 102, or when the user 106 first registers with the communication system, but which the user 106 can later override.

Figure 2:
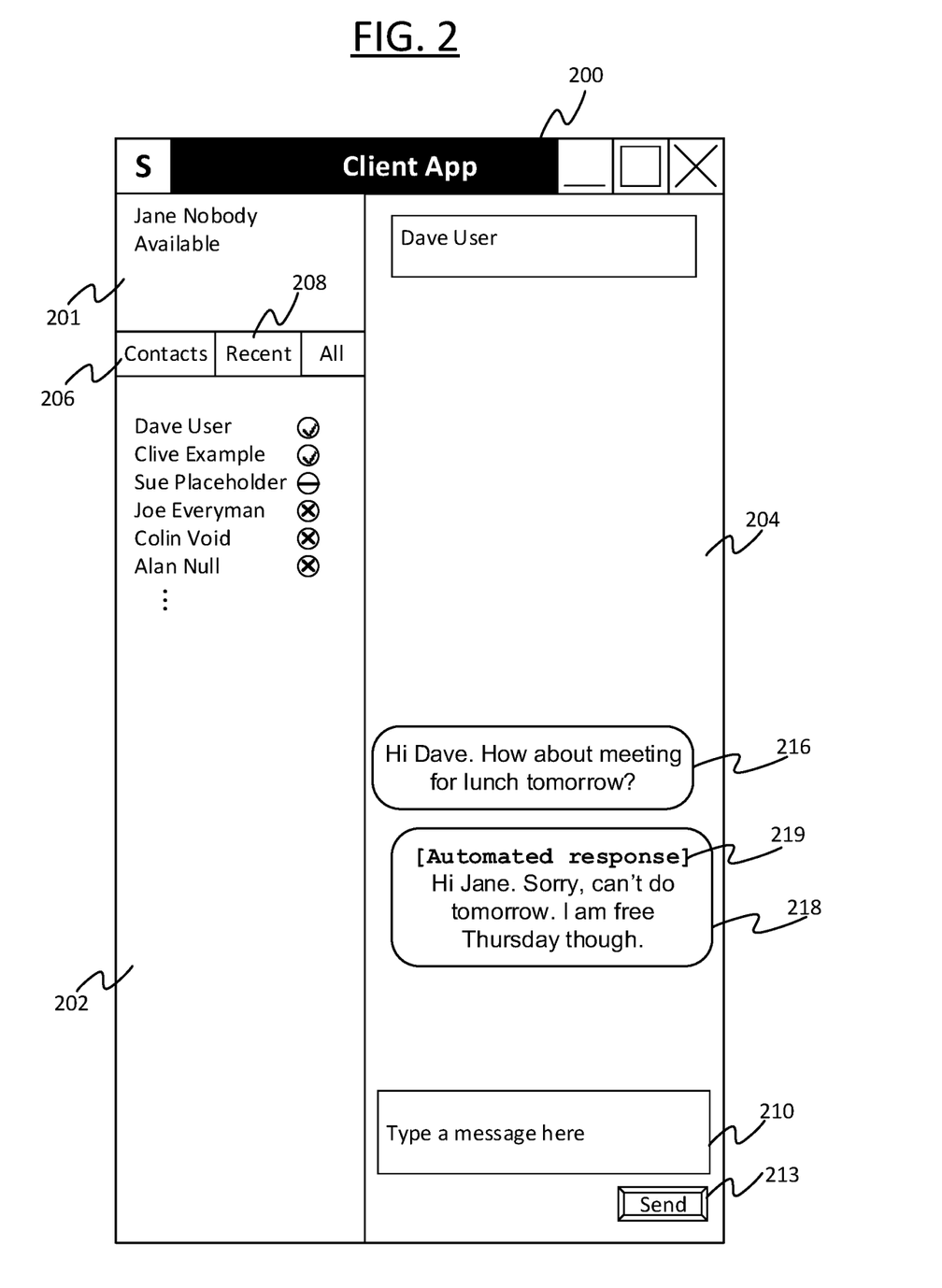
FIG. 2 is a schematic mock-up of a user interface.

FIG. 2 shows the front-end user interface (UI) 200 of the client application 103a running on the first user's terminal 102a (or of the web client accessed from the first user's terminal 102a). The UI 200 comprises a plurality of UI areas such as a local user pane 201 and a conversation pane 204. The local user pane 201 shows information about the first user 106a (the user of the terminal 102a on which the UI is displayed), e.g. his or her name, username, profile picture, and/or presence state. The conversation pane 204 shows the conversation currently being conducted or currently selected to be viewed by the first user 106a. The UI 200 may also comprise a user-operable contacts control 206 (e.g. a tab or button) and a user-operable history control 208 (e.g. again a tab or button). Actuating (e.g. clicking or touching) the contacts control 206 brings up a list of the first user's contacts from which he or she can select to establish communications with those contacts (which communications will be shown in the conversation pane 204). Actuating (e.g. clicking or touching) the history control 208 brings up a history pane (not shown) which displays a list of conversations and contact requests that the first user 106a has been involved in or received over a certain time-window into the past. In the arrangement shown, the history pane would be displayed in place of the contacts pane 202 when the history control 208 is actuated, and vice versa, but this need not necessarily be the case.

The conversation pane 204 is where the first user 106a actually conducts two-way conversations with other users (via the communication system in question), such as with the second user 106b. When another user such as the second user 106b sends a message 216 to the first user 106a, it appears in the conversation pane 204. Also, the conversation pane 204 comprises a messaging field 210 in which the first user 106a can enter messages to be sent to the user(s) 106 on the other end of the conversation, such as to the second user 106b. When the first user actuates a send control, e.g. clicking or touching a graphical UI element 213 or hitting a predetermined key on the keyboard such as enter, this causes the client 103a to send the message that has been composed through the messaging field 210 to the second client 103b via the network 101 (and in embodiments via the server 104), to be output to the second user 106b by the second client 103b on the second user terminal 102b. When a response 218 is received from the second user 106b, this is also displayed in the conversation pane 204.

Note that the term "conversation" as used herein does not limit as to the type of messages being exchanged. For example, the messages exchanged as part of the conversation may comprise any one or more of: text-based messages (e.g. IM messages), live voice and/or video streams (voice and/or video calls), still images (e.g. picture messages or emojis), pre-recorded audio clips (voice mail), pre-recorded video clips (video messages), a shared location, a slide show, a screen-share, content from an electronic or virtual whiteboard, or any combination of such message types. E.g. the first user 106a can paste in or drag and drop video clips into the messaging field 210 and the clip will be sent over the network 101 to the user(s) on the other end, e.g. the second user 106b. Any such exchanges may be referred to herein as a "conversation".

In accordance with embodiments disclosed herein, the server 104 is also arrange to host at least one user agent 107 (i.e. the user agent 107 is stored on the server 104, arranged to run on the server 104). "User agent" herein refers to any autonomous software agent that acts on behalf of a user, either specifically in relation to the particular communication system in question (e.g. for the particular VoIP/IM system) or more generally (i.e. also acting on behalf of the user in other contexts). For instance, the user agent 107 may take the form a virtual digital assistant (VDA), an intelligent personal assistant (IPA), or a bot. The user agent 107 in the illustrated scenario is arranged to act on behalf of the second user 106b, and will be described from this perspective in the following examples. However, it will be appreciated that similar user agents may be provided for any other users of the communication system.

Note: instead of the server 104, in other embodiments the user agent 107 may be implemented on the second user terminal 102b, or on the first user terminal 102a. In further embodiments the functionality could even be split between the server 104 and the second user terminal 102b or between the server 104 and the first user terminal 102a (or even between all three of these elements) based on distributed processing techniques.

In accordance with embodiments of the present disclosure, the user agent 107 is arranged so as when run on the server 104 to intercept a message from the first user 106a destined for the second user 106b (or to receive metadata indicative of the content of the message), and to analyse the user content of the message (e.g. the text) using natural language processing (NLP) or the like. That is to say, the user agent analyses the payload of the message, i.e. the actual content composed by the first user 106a (wherein this analysis may be performed either directly by directly analysing the actual media of the payload, e.g. the actual text, or indirectly by receiving and analysing metadata indicative of the content of the payload). Furthermore, the user agent 107 is configured to access information concerning the second user, such as the second user's calendar, location, profile, etc. Based on the analysis of the content of the first user's message, together with the information concerning the second user, the user agent 107 then automatically predicts a response that the second user 106b might give to the first user's message. Further, the user agent 107 is configured to automatically send this predicted response back to the client 103a on the first user's terminal to be automatically output to the first user 106a (or equivalently returns metadata representative of the predicted response that might be used to generate such a response, thus allowing the predicted response to be automatically formulated by the client 103a at the first user terminal 102a, and prompting the first client 103a to do so). Where it is said "automatically", this means the user agent 107 is configured to do this without waiting for any kind of manual approval or editing of the predicted response by the second user 106b (or indeed any user).

In embodiments, when the first client 103a on the first user terminal 102a sends a message (e.g. an IM message) to the second client 103b on the second terminal 102b, the message may be sent via the server 104. Also, as discussed, the user agent 107 may be implemented on the server 104. In such embodiments, the user agent 107 is able to intercept the message along its normal path and thereby extract the content to be analysed. Alternatively, the message may be sent directly between the first and second user terminals 102a, 102b (i.e. without being send via the server 104). In such embodiments, the client 103 may be configured to send a copy of the message or its content to the server 104, or to send metadata indicative of the content to agent 107 on the server 104.

In further alternatives, the user agent 107 may be implemented on the second (i.e. receiving) user terminal 102b (either incorporated into the second client 103b or the operating system or installed as separate application). In such cases, the user agent has access to the message content because the message has been received at the second user terminal 102b. In yet further alternative embodiments, the user agent may be implemented at least in part on the first (i.e. sending) user terminal 102a (either incorporated into the first client 103a or the operating system or installed as separate application). In such cases, the client 103b on the second terminal 102b can access the content as composed locally on the first user terminal 102a.

In embodiments, the user agent may be configured to analyse the message content according to a set of predetermined rules specifying predetermined responses. Alternatively, the user agent 107 may be configured to perform the analysis of the message content using any suitable language processing algorithm known in the art, e.g. based on natural language processing (NLP). In itself, it is known in the art how to recognize an abstract intent from a natural language input. In embodiments, the set of rules or the language processing algorithm may also be configured to be trained by a machine learning algorithm, such as a neural net or deep learning algorithm (details of which are in themselves also known in the art).

As another possibility, the user agent 107 may be implemented on a completely separate device or server altogether, unrelated to the communication system, its server 104, or the user devices 102a, 102b. In this case the message may be sent via the user agent 107 on this other server or device, or a copy of the message or its content may be sent to the user agent 107, or metadata indicative of the content may be sent to the user agent 107.

In embodiments, the message comprises a textual (text-based) message, i.e. comprising text composed by the first user 106a. An example of such a message is an IM message. In this case the language recognition algorithm of the user agent 107 is configured to analyse the user-composed text of the message in order to extract its meaning, i.e. to extract the intention of the first user 106a. Alternatively or additionally, the message may comprise one or more other media such as audio and/or video. In such cases, the language recognition algorithm may be configured to analyse the audio of the message or even to recognize visual linguistic elements such as sign language or lip-reading cues in a video, and to extract the intent of the first user 106a from this.

Note that where it is said that the content of the message is analysed, or such like, this refers generally to the substantive meaning or subject matter; which could be based on directly analysing the actual user-composed media of the message itself (e.g. directly processing the actual text or raw audio stream), or which alternatively could be based on analysing data abstracted from the text or other such media. E.g. in the latter case, the metadata may take the form of abstracted representations of concepts, linguistic elements, or an intention of the first user 106a.

The user agent 107 is also arranged to access one or more items of information relating to the second user 106b. This information may be stored on the second user terminal 102b or as part of the user information 105 stored on the server 104, or another server unrelated to the communication system, or a combination of any of these. If some or all of the information concerning the second user 106b is stored on the second user terminal 102b whilst the user agent 107 is implemented on the server 104 or first user terminal 102a, or if some or all of this information is stored in the server 104 whilst the user agent 107 is implemented on the second user terminal 102b or first user terminal 102a, then the user agent 107 may be configured to access the information via the network 101, e.g. the Internet. Otherwise if both the user agent 107 and the information on the second user 106b are implemented together on the server 104 or together on the second user terminal 102b, then of course the user agent 107 may access this information locally.

Based on the accessed information concerning the second user 106b, and based on the analysis of the content of the message from the first user 106a, the user agent 107 automatically generates content for an automated response to the message (examples of which will be elaborated upon shortly). Furthermore, the user agent 107 automatically acts (without awaiting confirmation from the second user 106b) such that the predicted response is output to the first user 106a via the client 103a on the first user terminal 102a.

In embodiments, the user agent 107 does this by formulating itself the actual media of the response (e.g. the text or audio). I.e. the data output by the user agent 107 is the final human-readable version of the message itself. The user agent 107 automatically sends the message in this form to the client 103a on the first user terminal 102a in order to cause the first client 103a to automatically output the message to the first user 106a. Alternatively however, the user agent 107 may not itself formulate the final media (e.g. text) of the message, but instead may output the content of the message in the form of metadata indicative of one or more abstracted concepts or linguistic elements signalling the simulated "intention" of the second user 106b, or data that might be relevant to this, thereby communicating the content of the response in a form other than the final formulation of the response per se. The user agent 107 then automatically sends this metadata back to the client application 103a on the first user terminal 102a (again without awaiting confirmation from the second user 106b), thereby causing the first client 103a uses the metadata to formulate the media (e.g. text) of the response and output the locally-formulated response to the first user 106a via the first user terminal 102a.

Note therefore that where it is said the user agent 107 predicts or generates the content of the response, this refers generally to the substantive meaning or subject matter of the response; which could be expressed in terms of the actual human-readable (or human-consumable) media of the message itself, such as the actual text of a return IM message, or which alternatively could be expressed by the user agent 107 in the form of data abstracted from the text or other such media (to then be formulated into a human-readable or human-consumable form by the first client 103a on the first user's terminal 102a). E.g. in the latter case, the metadata may take the form of the abstracted representations of concepts or linguistic elements as output by a NLP algorithm or machine learning algorithm.

In embodiments, the information concerning the second user 106b that is accessed and analysed by the user agent 107 may comprise, for example, information from an electronic calendar of the second user 106b. From the calendar, the user agent 107 may be able to determine, for example, a current and/or future availability of the second user 106b, a history of events or venues previously visited by the second user 106b, a history of types of cuisine previously consumed by the second user 106b, and/or typical patterns of behaviour of the second user 106b.

Alternatively or additionally, the analysed information may comprise a location of the second user 106b, which may be determined using any known localization technology such as triangulation, trilateration, multilateration, or fingerprinting based on signals transmitted between the second user terminal 102b and a plurality of reference nodes such as indoor location beacons, pre-existing wireless access points or cell towers, or satellites. For instance, the location may be determined using a satellite-based positioning system such as global positioning system (GPS), Galileo, or Global Navigation Satellite System (GLONASS). In other examples the location may be determined by detecting that the second user terminal 102b has come into the vicinity of a single reference node such as by detecting that the second user terminal 102b has connected to a certain access point, or has come into contact with a near-field communications (NFC) reference point such as a radio frequency (RF) tag, barcode or QR code, and by approximating that the location of the second user terminal 102b is approximately that of the reference point. In other examples, the location may be determined simply receiving a user input from the second user 106b indicating his or her location, e.g. when the second user 106b checks in at a certain location on social media. By whatever means the location of the second user 106b is detected, the user agent 107 thus is able to gain access to information on the location of the second user 106b. Such information may comprise the current location of the second user 106b, a history of locations previously visited by the second user 106b, and/or an extrapolated destination of the second user 106b.

In further alternative or additional embodiments, the information on the second user analysed by the user agent 107 may comprise information sourced from social media, and/or a web browsing history of the second user 106b, and/or information displayed on the screen of the second user terminal 102b, and/or one or more other devices of the second user 106b (e.g. obtained using an accessibility service or such like arranged to monitor all user activity). Such information may comprise, for example, a record of one or more visited web sites or pages, a location check-in history, and/or one or more reviews or opinions (e.g. "likes") posted by the second user 106b online, or "likes" or suggestions submitted in relation to one or more people, places, products, or types of product. E.g. such information may comprise reviews of one or more venues (e.g. restaurants, cafes, music venues, theatres, pubs, clubs, bars, etc.) and/or geographic locations (e.g. holiday destination, favourite part of town, etc.). The information sourced from social media could even extend to such information on friends or relations of the second user 106b on the social media site, on the basis that such information may give an insight into the second user 106b him- or herself.

In yet further alternative or additional embodiments, the information accessed and analysed by the second user agent 107 may comprise one or more explicit preferences set by the second user 106b and/or characteristics specified by the second user 106b. For instance, these preferences and/or characteristics settings may be set as part of the second user's profile comprised by the user information 105 stored on the server 104, and may be accessed by the user agent 107 therefrom. For instance, the second user 106b may specify in his/her profile a presence as to genre of music, or venue (e.g. the second user loves pop music but hates jazz, or the user is fond of Mexican food). As another example, the second user 106b may specify a dietary requirement in his/her profile (e.g. the second user is allergic to gluten, or is a vegetarian or vegan, or for religious reasons will not eat a certain animal or animals). As an example of a characteristic the user 106b may specify about him or herself, the user may indicate a certain ability or disability, e.g. wheelchair access required.

In yet further alternative or additional embodiments, the information accessed and analysed by the second user agent 107 may comprise a presence state of the second user 106b. Again this may form part of the user information 105 stored in relation to the second user 106b on the server 104, and may be accessed by the user agent 107 therefrom. For instance, the presence state may specify whether the second user 106b is currently on a call, or whether the second user 106b is inactive (has not interacted with his/her user terminal 102b for a certain predetermined time window), and/or whether the second user's client 103b is online or offline (whether it is currently registered with the communication system in question, e.g. the IM system). As mentioned previously, in embodiments such information may be detected automatically by the client 103b or system.

The described mechanism advantageously allows the first (i.e. sending) user 106a to refine his or her message based on the predicted response before the refined version of the response is finally delivered to the second (i.e. recipient) user 106b. Thus the communication between the first and second user 106a, 106b is made more efficient as it cuts out the some of the "toing and froing" between the users before a conclusion is reached.

In embodiments, the user agent 107 may be configured to provide the predicted response only after the first user manually actuates a send control 213 (e.g. see again FIG. 2);

Alternatively, the user agent 107 may be arranged to intercept the content of the message composed so-far before the user actuates any send control. In the latter case the user agent 107 is configured to instead respond while the first user 106a is still composing the message, e.g. while still typing the message. For instance, the first client 103a may be configured to dynamically transmit the text the first user 106a is currently typing to the user agent 107 on the server 104 dynamically as the first user is typing it, such that the user agent 107 can analyse the text and compare it against the information concerning the second user as the text is being typed, and interject with a predicted response before the first user 106a actuates the send control 213, and in some cases before the user has even finished typing the message.

Some example scenarios are now set out by way of illustration.

For instance, consider the case where the first user 106a composes or begins composing a message asking the second user 106b is free on a certain day, e.g. "Hi Dave. Are you free to go out this Friday?" The user agent 107 intercepts this message, and analyses it to determine that the first user intends to propose a social engagement during the evening of next Friday and that next Friday is 13 Jan. 2017. In response, the user agent 107 consults the second user's calendar entry for Friday, 13 Jan. 2017, during a range of times covering "evening", and from this determines that the second user 106b already has a prior engagement conflicting with that time and date (e.g. the second user 106b has a piano lesson that Friday from 8pm-9 pm). In response, having determined from NLP or the like that the intent in the message was to propose a time and date for a social engagement of some sort, the user agent 107 then consults the calendar of the second user 106b for an alternative slot when the second user 106b will be free. For instance, the user agent 107 finds that the second user has nothing in his/her calendar for Saturday, 14 January, or is free after 9 pm on Friday, 13 January. Based on this, the user agent 107 automatically formulates and returns a response back to the first user 106a on behalf of the second user 106b (without needing confirmation or approval from the second user 106b). For instance, the response may say something like "Hi Jane. Sorry, I can't do Friday. I am free Saturday though." or "Dave can do any time after 9 pm. Why not suggest that". Or the response may even suggest a complete alternative message to send.

Upon receiving this, the first user may then compose a new version of the message making an alternate proposal, E.g. "Hi Dave. Are you free to go out this Saturday?" The user agent 107 will analyse the content of the new version of the message in the same way described above for the original version. However the user agent 107 is also configured so that, if based on the analysis of the new version and the information concerning the second user 106b, the new version of the message does not warrant intervention by the user agent 107 (e.g. the new version of the message does not conflict with the information concerning the second user 106b), then the user agent 107 will allow the new version of the message to be presented to the second user 106b without sending any automatically predicted response on behalf of the second user 106b.

As another example, the predicted response may take into account the location of the second user 106b. For instance, say it is currently 11:30 am, and the first user 106a composes (or begins composing) a message saying something like "Hi Dave. Can you meet me under the clock at Waterloo at 12 noon today?" The user agent 107 detects and analyses this to extract the intention that the first user proposes a meeting at 12 noon at the location of Waterloo station. In response, the user agent 107 accesses the current location of the second user 106b, and inputs this along with the destination (Waterloo station) into a mapping algorithm to determine how long it would take the second user 106b to reach the proposed meeting point using one or more modes of locomotion (e.g. walking, public transport, taxi, car, or bicycle). The user agent may also take into account one or more other factors, e.g. whether the second user 106b is disabled, or whether he or she owns a bike or car, etc. The user agent 107 then determines whether it is possible for the second user 106b to reach the proposed meeting point. If it determines that it is not possible using any of the analysed modes of transport available to the second user 106b, then the user agent 107 returns an automated reply to the first user 106a along the lines of "Hi Jane, quite can't make 12 noon I'm afraid." or "Dave can't make it until a bit later." Optionally the user could instead additional information into the response indicating the current locational constraint, e.g. "Dave can't make it until a bit later—he's currently in Uxbridge."

Again, upon receiving this, the first user 106a may compose an alternate proposal, such as "Hi Dave. Can you meet me under the clock at Waterloo at 1 pm today?" or "Hi Dave. Can you meet me at Earl's Court as 12 noon today?". If the user agent 107 determines this is achievable for the second user 106b, it does not intervene with another automated response.

In another example, the predicted response may take into account a user preference and/or dietary requirement of the second user 106b. For instance, say the first user 106a composes (or is composing) a message saying something like "Hi Dave, let's go out for dinner tonight. How about Mario's Restaurant?" However, the user agent 107 is able to determine that the second user 106b has previously given poor reviews to Mario's Restaurant on social media or a forum, or has indicated in his/her profile that he or she dislikes Italian food, or perhaps that the second user 106b has a food allergy that is not catered for by Mario's. In response, the user agent 107 returns an automated response saying something like "Sorry, I don't like Mario's" or "Sorry, I don't like Italian food". In embodiments, the user agent 107 may be configured to propose an alternate based on one or more preferences or characteristics of the second user 106b. E.g. if the user agent 107 determines from the second user's profile, social media posts or browsing history that he/she likes Mexican food, or has highly rated a certain restaurant such as Juan's Grill, then the user agent 107 may return a response saying something like "Dave prefers Mexican food" or "What about Juan's Grill instead?" Again, the first user 106a can then compose an alternative suggestion that the second user 106b is more likely to accept.

Similarly, the first user 106a could ask "Let's go to the 606 Club tonight." However, the user agent 107 looks up online or in a database that the 606 Club is a jazz club and also determines that the second user 106b has indicated in his or her profile, or infers from his/her browsing history, or such like, that he/she dislikes jazz music, and so may reply along the lines of "No way, I can't stand jazz". In embodiments the user agent 107 may look up in the second user's profile or such like that his/her favourite style of music is pop, so suggests an alternate venue playing that style of music.

In another example, the predicted response may take into account a presence state of the second user 106b. E.g. say the first user sends or is about to send a message saying "Can I pop in to see you now?", but the user agent 107 detects that the first user 106a is currently on a call with another user. In response the user agent 107 may respond automatically saying something like "Sorry, can't see you now" or "Sorry, busy on a call right now."

As can be appreciated from the various examples above, the disclosed mechanism thus reduces the number of intermediate messages that require involvement of the second user 106b, or reduces the likelihood that the first user 106a will present the second user 106b with a message needlessly requiring the second user's input. This thus assists the sender (first user) 106a to draft a more efficient message in terms of achieving an efficient exchange between first and second user 106a, 106b.

Reference is now made again to FIG. 2. In terms of user experience, in some embodiments the predicted response 218 may be presented to the first user 106a with an indication 219 that this is automatically generated response sent on behalf of the second user 106b, as opposed to a response composed by the second user 106b him/herself. Alternatively, the predicted response 218 may be presented to the first user 106a without any such indication. With regard to the information that is presented to the second user 106b, in embodiments the initial message from the first user 106a is presented to the second user 106b through his/her client 103b, but with an indication that an automated reply has already been sent back to the first user 106a. This indication to the second user 106b may indicate what the predicted response was, i.e. the content of the predicted response, either in the form of the final media (e.g. text) that was formulated to present to the first user or in a more abstracted form such as the raw data that was shared with the first user 106a. Alternatively it may just indicate the fact that a predicted response was sent (i.e. without the content). In some other embodiments, the user agent 107 may prevent the initial message from the first user 106a ever being sent to the second terminal 102b, or at least from ever being presented to the second user 106b. Alternatively, the message may be provided to the client 103b on the second user terminal 102b, but the second user 106b is not automatically prompted with the message. Instead the response is logged but is not summoned unless the second user 106b actuates an associated user interface (UI) control, i.e. the log of the initial message is hidden behind a UI element of the second client 103b.

In embodiments, the user agent 107 is configured to access one or more permission settings of the second user 106b and to only perform one or more of the above operations on condition that it is permitted to do so by the permission settings. There are different possible permissions, any one or more of which the user agent 107 may, in embodiments, be configured to defer to. These may comprise any one or more of: (i) whether the user agent 107 is permitted to automatically send predicted responses on behalf of the second user 106b at all, (ii) whether the user agent 107 is configured to access information concerning the second user, (iii) what particular information is the user agent permitted to access concerning the second user 106b, and/or (iv) which other users the user agent 107 is allowed to automatically reply to or share information concerning the second user 106b with. Thus, the second user 106b is given control over whether to activate the automated response feature, and/or what information the second user 106b is prepared to share, and/or who this information is shared with.

These permission settings may be part of the user's profile comprised by the user information 105 stored on the server 104. Alternatively, the permission settings may be a separate part of the user information 104, or may be stored elsewhere, e.g. locally on the second user terminal 102b. If the user agent 107 is implemented on a different network element than the permission setting (e.g. the user agent 107 is on the server 104 but the setting or settings is/are stored on the second user terminal 102b), then the user agent 107 is configured to access the settings from the relevant element via the network 101, e.g. the Internet. Otherwise if the user agent 107 is implemented on the same network element as the setting(s) (e.g. both are on the server 104), then the user agent 107 may of course access this/these locally.

In embodiments, the permission settings comprise at least a setting allowing the second user 102b to specify whether or not the user agent is allowed to send automated responses on his/her behalf. The user agent 107 is configured to consult this permission setting beforehand, and to only send the predicted response on condition that the relevant permission setting is set to allow this. Alternatively or additionally, the permission settings may comprise a setting whereby the second user 106b specifies whether the information concerning the second user 106b is permitted to be shared with the user agent 107. This may comprise a single setting for the information as a whole, and/or an individual setting for individual items of information.

Alternatively or additionally, the permission settings may comprise an individual permission setting for different individual other users or groups of users, setting whether that user or group of users is allowed to be provided with automated responses, and/or which information is allowed to be used to predict a response to the respective user or group of users. E.g. the second user 106b may divide his/her contacts into categories such as friends, family, colleagues, etc., and may select to only allow automated responses to a selected one or more of the categories such as to friends and family but not colleagues; or the second user 106b may select to allow the responses to be generated based on different amounts of information for the different categories, e.g. to select the most information for friends, a medium amount for family, and the least information for colleagues. As another example, the second user 106b could select to turn off automated responses or allow them to be based on limited information for a particular individual contact that the second user 106b does not trust much, or could turn on automated responses or allow them to be based on a greater amount of shared information only for one or more selected individuals whom the second user 106b trusts well.

As a further possibility, the permission settings may comprise a setting enabling the second user to set a limit on how many predicted responses can be provided automatically on behalf of the second user 106b within a given time window, e.g. a day. This could be either a limit on the total number, or a limit per sending user (i.e. a limit on how many times a given sender can receive an automated response). The user agent 107 may be configured so as after the limit is reached to cease generating predicted messages on behalf of the second user 106b until the next instance of the time window begins, e.g. until the next day. Alternatively, the user agent 107 may continue to generate predicted responses, but after the limit is reached, may only present them to the second user as suggestions requiring the second user's approval, rather than providing them to the first user 106a automatically. As another possibility, the user agent 107 may limit the type of information that will be shared in subsequent predicted responses, e.g. no calendar details.

Any of the above settings could be dedicated settings which may be provided to control the access to the information specifically for the user agent 107. Alternatively, any one or more such settings may be the same setting(s) that also set whether information is shared for other purposes, e.g. whether profile information 105 is shared with other users or other applications in general. Such settings could be explicit settings, or could be implicit in other settings, e.g. implicit in setting a contact to a certain category of relationship (e.g. friend, family, colleague, etc.)

In further embodiments, the user agent 107 may further be configured to take into account information on the first user 106a when formulating the predicted response. This could for instance comprise any one or more of the items of information discussed above in relation to the second user 106b (but the corresponding information relating to the first user 106a). Further, anything said above regarding the storage, access, and analysis of the information concerning the second user 106b may also apply in relation to storing, accessing, and analysing the information concerning the first user 106a. For instance, if the user agent 107 has access to information from both users' calendars, the user agent 107 can propose an alternate time and date for a meeting or social engagement that fits both users' schedules. Or if the user agent 107 has access to both users' geographic locations, then the user agent can propose a meeting place that is within a certain distance or travel time of both users 106a, 106b. For instance, say the second user 106b has a meeting until time T, and the first user has a meeting starting at time T+1 hr. Given also the current locations of both users 106a, 106b; the user agent 107 may be able to determine that they can manage a half hour meeting at point X which is mutually 15 mins journey away from each of their current locations. By automatically providing this information back as a response to the first user 106a, this can avoid a lot of back-and-forth communication between the first and second users 106a, 106b that would likely have been involved otherwise.

Moreover, in some such embodiments, the user agent 107 may also be configured to take into account one or more permission settings set by the first user 106a (and anything said above about the storage of and access to the permission settings of the second user 106b may also apply to those of the first user 106a). For instance, the first user 106a may be provided with the ability to allow or disallow automated responses to be provided to him/her, or to allow or disallow automated responses from certain selected individual other users or groups of users. Thus, even if the second user 106b has turned on automated responses, the user agent 107 still may not provide an automated response if the first user 106a has selected that he or she does not wish to receive such responses. Alternatively or additionally, the first user 106a may be provided with the ability to select whether or not the user agent 107 is allowed to take into account information on the first user 106a when generating the predicted response, and/or what information on the first user 106a the user agent 107 can use in doing so. Again, in some embodiments, different amounts of information could be allowed to be shared with different individual other users or different groups of users.

In some embodiments, the first user 106a may even be provided with his or her own user agent (not shown), e.g. implemented on the server 104, first user terminal 102a or even the second user terminal 102b. This may be configured in the same way as described above in relation to the user agent 107 arranged to act on behalf of the second user 106b, but arranged to act on behalf of the first user 106a. In such an arrangement, before the predicted response being finally provided to the first user 106a, the second user's agent 107b may be configured to revert to the first user's agent to determine one or more of the items of information concerning the first user 106a. For example, the second user's agent 107b may request calendar information and/or location information for the first user from the first user's agent, and/or may request preferences, browsing history, social media data, etc. of the first user from the first user's agent. The second user's agent 107b may then take this into account when generating the response (e.g. so as to ensure a mutually suitable date, geographic location, and/or venue for a meeting or social engagement). In embodiments, this process may even involve multiple exchanges between the first and second users' agents in order to negotiate a mutually suitable time, geographic location, venue type, genre of event, and/or style of cuisine, etc., for both users. Thus, in embodiments, through inter-agent interaction the efficiency of communication can be improved even further.

In some embodiments, the user agent of the first user 106a may even be arranged to analyse the content of an initial predicted response from the second user's user agent 107b, and to access information concerning the first user (such as any of the items of information discussed above in relation to the second user 106b). Based on both of these together, the first user's agent may be configured to predict a counter response to the response from the second user's agent 107b. That is to say, in some embodiments, the second user's agent 107b need not necessarily formulate its request for information on the first user 106a as a machine-to-machine communication nor know that the request is going to be handled by another agent acting on behalf of the first user 106a. Instead, the second user's agent 107b provides (or causes to be provided) an initial predicted response that is suitable for consumption by the first user 106a, but happens to be intercepted and handled by an agent of the first user.

Unlike the response from the second user's user agent 107b, the first user's user agent may be configured to present the counter-response to the first user 106a as a proposed counter-response, i.e. requiring the first user's confirmation. Alternatively, the first user's agent may even be configured so as, depending on the analysed content relative to the information concerning the first user 106a, to automatically send the counter-response back toward the second user 106b (in embodiments without presenting the first user 106a with either the initial predicted response from the second user's agent or the counter-response form the first user's agent). In some scenarios, this counter-response may itself be analysed by the second user's agent 107b, and so forth. Hence in some scenarios, the first and second users' agents could engage in one or more rounds of fully automated response and counter-response before a message is finally presented to the second user 106b requiring a manual response from the second user 106b. Where one or more rounds of automatic response and counter-response can be performed, because there is sufficient information available to the agents concerning the first and second users 106a, 106b, then this advantageously saves on multiple rounds of manual iterations in the conversation in order for a conclusion to be reached. In embodiments, the disclosed mechanism also provides an improvement from a privacy perspective as only the agent(s) see the raw data whilst the users just see the final result.

In yet further embodiments, the user agent may comprise an aggregator configured to combine an analysis of the content of messages from multiple sending users, and optionally to access information concerning each of these users, and to generate a predicted response based on the combined analysis and optionally the information on the multiple users. That is, the user agent 107 is configured to analyse not only the content of the message composed by the first user 106a, but also those of one or more further users (not shown). In embodiments the user agent 107 also accesses information concerning the first user 106a and the one or more further users. The user agent 107 can then generate an automated response taking into account the content of the message from not only the first user 106a but also from the one or more further users, and optionally also taking into account information concerning not only the first user 106a but also concerning the one or more further users. Alternatively or additionally, where a given message from a given sender is sent (or to be sent) to multiple recipients, the aggregator of the user agent 107 may take into account information concerning each of the multiple recipients when generating the predicted response. The mechanism for analysing the messages from the one or more other users and for accessing the information on the one or more other users may be substantially similar to that described above in relation to the first user 106a. Thus advantageously, the user agent 107 can also handle the prediction of a response on behalf of the second user 106b in multiparty scenarios (involving three or more participant in total).

For instance, consider the case where users in a multiparty IM chat session, or such like, are trying to agree on a mutually suitable date for a certain meeting or social engagement. Often this descends into a complex, multi-way back-and-forth exchange of messages with users struggling to find a common schedule slot which they all have free. However, with an automated user agent 107 provided to access the schedule of the second user 106b, and also in embodiments, the schedules of the one or more other users, then the user agent 107 can advantageously streamline the process of finding a common diary date, thus reducing the number of exchanges required between users in order to come to a conclusion.

It will be appreciated that the above embodiments have been described only by way of example.

More generally, according to one aspect disclosed herein, there is provided equipment for use in communicating between a first user and a second user, the equipment comprising a processing apparatus and memory, the processing apparatus comprising one or more processing units, and the memory comprising one or more memory units; wherein the memory stores code comprising a user agent arranged to run on the processing apparatus, the user agent being configured so as when run on the processing apparatus to act on behalf of the second user by performing operations of: analysing content of a message from the first user destined for the second user, the content being composed by the first user; determining information concerning the second user; based on the analysed message content and the determined information concerning the second user, automatically predicting content of a response of the second user to the message; and outputting data causing the response including the automatically predicted content to be automatically provided to the first user.

In embodiments, the user agent is configured to analyse the content of the message and to cause the predicted response to be provided back to the first user before first user has actuated a send control for sending the message. Alternatively, the analysis and the provision of the predicted response to the first user may be performed in response to the manual actuation by the first user of a send control to send the message.

In embodiments, the user agent may be configured so as, when the first user composes an amended version of the message based on the predicted response, the amended version of the response comprising amended content composed by the first user, the user agent analyses the amended content and in dependence on said analysis of the amended content relative to said information concerning the second user, provides the amended version to the second user for the second user to respond to manually.

In embodiments, the user agent may be arranged to prevent the message being provided to the second user. Alternatively, the user agent may be configured to allow the message to be provided to the second user, but to include an indication to the second user that the response has already been sent.

In embodiments, the user agent may be configured to log the information that has been shared with the first user as a result of the response, and to make said log available to the second user.

In embodiments, the user agent may be configured to provide to the first user an indication that the response was a predicted automatically rather than composed by the second user. Alternatively, the user agent may be configured not to provide any indication to the first user that the response was predicted automatically, such that the response appears to the first user to have originated from the second user.

In embodiments, said information concerning the second user may comprise one or more of: information determined from a computerised calendar of the second user, information on a location of the second user, information sourced from social media, information determined from a browsing history of the second user, information determined from a screen of one or more devices of the second user, a presence state of the second user, and/or one or more preferences explicitly specified by the second user in a store of user preferences.

In embodiments, any such information concerning the second user may comprises one or more of: a current or future availability of the second user; a current geographic location of the second user; a preference specified by the second user as to venue, genre of event, or type of cuisine; a history of one or more events previously attended by the second user, one or more venues or geographic locations previously visited by the second user, or one or more types of cuisine previously consumed by the second user; a history of one or more events, venues, or types of cuisine recommended by the second user to one or more other users; a dietary requirement of the second user; an ability or disability of the second user; and/or whether the second user is currently on a call.

In embodiments, the content of the message may make a proposal to the second user; and the user agent may be configured to automatically generate a counterproposal for the first user based on the proposal and the information concerning the second user, the predicted response comprising the counterproposal.

In embodiments, the user agent may be further configured to automatically predict content of the response based on information concerning the first user.

In embodiments, said information concerning the first user comprises one or more of: information determined from a computerised calendar of the first user, information on a location of the first user, information sourced from social media, information determined from a browsing history of the first user, information determined from a screen of one or more devices of the first user, and/or one or more preferences explicitly specified by the first user in a store of user preferences.

In embodiments, any such information concerning the first user may comprise one or more of: a current or future availability of the first user; a current geographic location of the first user; a preference specified by the first user as to venue, genre of event, or type of cuisine; a history of one or more events previously attended by the first user, one or more venues or geographic locations previously visited by the first user, or one or more types of cuisine previously consumed by the first user; a history of one or more events, venues, or types of cuisine recommended by the first user to one or more other users; a dietary requirement of the first user; and/or an ability or disability of the first user.

In embodiments, the user agent may be configured to obtain at least some of the information concerning the first user from one or more interactions with an agent acting automatically on behalf of the first user.

In embodiments, the user agent may be configured to analyse content of one or more further messages from one or more respective further sending users further to the first user, each of the further messages comprising content composed by the respective further sending user; and wherein the user agent is further configured to automatically predict the content of said response based on the content of the first user's message and the one or more further messages, and to output data causing the response to be automatically provided to the first user and the one or more further sending users.

In embodiments, the user agent may be configured to access information concerning one or more additional receiving users in addition to the second user, and to automatically predict the content of said response based on the information concerning the second user and the one or more additional receiving users.

In embodiments, the user agent may be configured to access one or more permission settings of the second user, and to cause the automatic provision of said response on condition that the one or more permission settings is/are set by the second user to permit the user agent to provide automated responses on behalf of the second user, and/or to permit the user agent to access said information concerning the second user.

In embodiments, the user agent may be configured to access permissions settings in which second user can set individual permissions to allow or disallow access to different respective items of information, wherein the user agent may be configured to select said information concerning the second user only from amongst those items to which it is permitted access by the permissions settings of the second user.

In embodiments, the user agent may be configured to access permissions settings in which second user can set individual permissions to allow or disallow automated responses for different respective users, wherein the user agent may be configured to cause the automatic provision of said response on condition that the first user is amongst those permitted to receive automated responses according to the permissions settings of the second user.

In embodiments, the user agent may be configured to impose a limit on how many times first user can receive an automated response on behalf of the second user within a predetermined time window, and/or to impose a limit on how many users can receive an automated response on behalf of the second user within a predetermined time window.

In embodiments, the user agent may be configured to access one or more permission settings of the first user, and to cause the automatic provision of said response on condition that the one or more permission settings is/are set by the first user to permit the user agent to send automated responses to the first user.

In embodiments said equipment may be comprised by a server, or a user terminal of the second user, or a user terminal of the first user, or a combination of any two or all three of these.

According to another aspect disclosed herein there is provided a system comprising the first user's terminal, the second user's terminal, and optionally the server.

In some embodiments, there may be provided a system comprising said equipment and another user agent acting on behalf of the first user (wherein this other user agent may be implemented on said equipment or elsewhere in the system). The first user's agent may be configured to analyse the content of the response predicted by the second user's agent, to access information concerning the first user, and based on said analyses of the content of the response and the accessed information concerning the first user, to automatically predict a counter-response of the first user to the response. The first user's agent may be configured to output this predicted counter-response to the first user as a suggested counter-response requiring the first user's approval. Alternatively, the first user's agent may be configured to output data causing the predicted counter-response to be automatically provided to the second user (i.e. without waiting for any manual approval from the first user).

According to another aspect disclosed herein, there is provided a method comprising: analysing content of a message from a first user destined for a second user, the content being composed by the first user; determining information concerning the second user; based on the analysed message content and the determined information concerning the second user, automatically predicting content of a response of the second user to the message; and outputting data causing the automated response including the automatically predicted content to be automatically provided to the first user.

In embodiments the method may further comprise steps in accordance with any of the embodiments disclosed herein.

According to another aspect disclosed herein, there is provided a computer program product comprising a user agent for acting on behalf of a second user in communications between a first user and the second user, the user agent comprising code embodied on computer-readable storage and configured so as when run on one or more processing units to perform operations of: analysing content of a message from a first user destined for a second user, the content being composed by the first user; determining information concerning the second user; based on the analysed message content and the determined information concerning the second user, automatically predicting content of a response of the second user to the message; and outputting data causing the automated response including the automatically predicted content to be automatically provided to the first user.

In embodiments the user agent may be configured so as when run on the processing apparatus to perform operations in accordance with any of the embodiments disclosed herein.

Other variants or applications of the techniques disclosed herein may become apparent to the person skilled in the art in light of the present disclosure. The scope of the disclosure is not limited by the described embodiments but only by the accompanying claims.

What is claimed is:

1. A system configured to generate an automatic response to a communication between first and second users associated with first and second devices, respectively, the system comprising:
   a processor; and
   a memory in communication with the processor, the memory comprising executable instructions that, when executed by the processor, cause the processor to control the device to perform functions of:
   receiving, from the first device via a communication network, a first communication sent from the first user to the second user;
   analyzing, using a machine-based language processing, a payload of the received first communication;
   automatically determining, based on analyzing the payload of the received first communication, that the first communication includes a proposal to schedule a meeting at a future time;
   in response to determining that the first communication includes the proposal to schedule the meeting, automatically searching a data storage containing schedule data of the second user to identify the second user's available future time slot for the meeting;
   automatically generating, based on the identified second user's available future time slot, a second communication responding to the first communication on behalf of the second user, the second communication including an indication of the identified second user's available future time slot for the meeting; and
   causing the second communication to be displayed via a user interface of at least one of the first and second devices.

2. The system of claim 1, wherein, for causing the second communication to be displayed via the user interface of the first device, the instructions, when executed by the processor, further cause the processor to control the system to perform a function of causing, in response to receiving the first communication, the second communication to be automatically displayed via the user interface of the first device.

3. The system of claim 2, wherein the instructions, when executed by the processor, further cause the processor to control the system to perform a function of causing an indication that the second communication is an automated response to be displayed via the user interface of the first device.

4. The system of claim 2, wherein the instructions, when executed by the processor, further cause the processor to control the system to perform a function of determining, prior to causing the second communication to be automatically displayed via the user interface of the first device, that the system is permitted to cause the second communication to be automatically displayed via the user interface of the first device.

5. The system of claim 1, wherein, for causing the second communication to be displayed via the user interface of the second device, the instructions, when executed by the processor, further cause the processor to control the system to perform a function of causing the second communication to be displayed via the user interface of the second device prior to causing the second communication to be displayed via the user interface of the first device.

6. The system of claim 5, wherein the instructions, when executed by the processor, further cause the processor to control the system to perform a functions of:
receiving, from the second user, a user input to modify the second communication displayed via the user interface of the second device; and
modifying, based on the user input received from the second user, the second communication.

7. The system of claim 5, the instructions, when executed by the processor, further cause the processor to control the system to perform functions of:
receiving, from the second user, a user input to approve the second communication; and
in response to the user input received from the second user, causing the second communication to be displayed via the user interface of the first device.

8. The system of claim 1, wherein:
the first communication includes the proposal to schedule the meeting at a first future time slot,
for identifying the available future time slot for the meeting, the instructions that, when executed by the processor, further cause the processor to control the system to perform functions of:
determining, based on the schedule data of the second user, that the second user is not available at the first future time slot; and
in response to determining that the second user is not available at the first future time slot, identifying, based on the schedule data of the second user, a second future time slot at which the second user is available, and
for automatically generating the second communication, the instructions that, when executed by the processor, further cause the processor to control the system to perform a function of including, in the second communication, a counter proposal to schedule the meeting at the second future time slot.

9. The system of claim 1, wherein:
the instructions, when executed by the processor, further cause the processor to control the system to perform a function of searching the data storage containing schedule data of the first user to identify the first user's available future time slot for the meeting, and
the second communication is automatically generated further based on the first user's available future time slot for the meeting.

10. A method of operating a system for generating an automatic response to a communication between first and second users associated with first and second devices, respectively, comprising:
receiving, from the first device via a communication network, a first communication sent from the first user to the second user;
analyzing, using a machine-based language processing, a payload of the received first communication;
automatically determining, based on analyzing the payload of the received first communication, that the first communication includes a proposal to schedule a meeting at a future time;
in response to determining that the first communication includes the proposal to schedule the meeting, automatically searching a data storage containing schedule data of the second user to identify the second user's available future time slot for the meeting;
automatically generating, based on the identified second user's available future time slot, a second communication responding to the first communication on behalf of the second user, the second communication including an indication of the identified second user's available future time slot for the meeting; and
causing the second communication to be displayed via a user interface of at least one of the first and second devices.

11. The method of claim 10, wherein causing the second communication to be displayed via the user interface of the first device comprises causing, in response to receiving the first communication, the second communication to be automatically displayed via the user interface of the first device.

12. The method of claim 11, further comprising causing an indication that the second communication is an automated response to be displayed via the user interface of the first device.

13. The method of claim 11, further comprising determining, prior to causing the second communication to be automatically displayed via the user interface of the first device, that the system is permitted to cause the second communication to be automatically displayed via the user interface of the first device.

14. The method of claim 10, wherein causing the second communication to be displayed via the user interface of the second device comprises causing the second communication to be displayed via the user interface of the second device prior to causing the second communication to be displayed via the user interface of the first device.

15. The method of claim 14, further comprising:
receiving, from the second user, a user input to modify the second communication displayed via the user interface of the second device; and
modifying, based on the user input received from the second user, the second communication.

16. The method of claim 14, further comprising:
receiving, from the second user, a user input to approve the second communication; and
in response to the user input received from the second user, causing the second communication to be displayed via the user interface of the first device.

17. The method of claim 10, wherein:
the first communication includes the proposal to schedule the meeting at a first future time slot,
identifying the available future time slot for the meeting comprises:
   determining, based on the schedule data of the second user, that the second user is not available at the first future time slot; and
   in response to determining that the second user is not available at the first future time slot, identifying, based on the schedule data of the second user, a second future time slot at which the second user is available, and
automatically generating the second communication comprises including, in the second communication, a counterproposal to schedule the meeting at the second future time slot.

18. The method of claim 10, further comprising searching the data storage containing schedule data of the first user to identify the first user's available future time slot for the meeting,
   wherein the second communication is automatically generated further based on the first user's available future time slot for the meeting.

19. A non-transitory computer readable medium containing instructions which, when executed by a processor, cause a computer to perform functions of:
   receiving, from the first device via a communication network, a first communication sent from a first user associated with the first device to the second user associated with a second device;
   analyzing, using a machine-based language processing, a payload of the received first communication;
   automatically determining, based on analyzing the payload of the received first communication, that the first communication includes a proposal to schedule a meeting at a future time;
   automatically searching, in response to determining that the first communication includes the proposal to schedule the meeting, a data storage containing schedule data of the second user to identify the second user's available future time slot for the meeting;
   automatically generating, based on the identified second user's available future time slot, a second communication responding to the first communication on behalf of the second user, the second communication including an indication of the identified second user's available future time slot for the meeting; and
   causing the second communication to be displayed via a user interface of at least one of the first and second devices.

20. The non-transitory computer readable medium of claim 19, wherein the instructions, when executed by the processor, further cause the processor to control the device to perform a function of causing, in response to receiving the first communication, the second communication to be automatically displayed via the user interface of the first device.

21. The non-transitory computer readable medium of claim 19, wherein the instructions, when executed by the processor, further cause the processor to control the device to perform a function of causing the second communication to be displayed on via the user interface of the second device prior to causing the second communication to be displayed on via the user interface of the first device.

* * * * *